(12) United States Patent
Okumura et al.

(10) Patent No.: US 8,642,217 B2
(45) Date of Patent: Feb. 4, 2014

(54) LITHIUM SECONDARY BATTERY

(75) Inventors: Takefumi Okumura, Hitachinaka (JP); Ryo Inoue, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 428 days.

(21) Appl. No.: 13/023,617

(22) Filed: Feb. 9, 2011

(65) Prior Publication Data

US 2011/0195319 A1  Aug. 11, 2011

(30) Foreign Application Priority Data

Feb. 9, 2010 (JP) ................................. 2010-026052

(51) Int. Cl.
*H01M 6/16* (2006.01)

(52) U.S. Cl.
USPC ............................. 429/332; 429/338; 429/188

(58) Field of Classification Search
USPC .................... 429/188, 326, 332, 338
See application file for complete search history.

(56) References Cited

U.S. PATENT DOCUMENTS

| | | | | |
|---|---|---|---|---|
| 5,977,277 | A * | 11/1999 | Yokoyama et al. | 526/314 |
| 6,074,776 | A * | 6/2000 | Mao et al. | 429/61 |
| 2008/0292971 | A1 * | 11/2008 | Ihara et al. | 429/331 |
| 2010/0099031 | A1 * | 4/2010 | Kato et al. | 429/330 |
| 2011/0171501 | A1 | 7/2011 | Okumura et al. | |

FOREIGN PATENT DOCUMENTS

| JP | 2005-267911 | 9/2005 |
|---|---|---|
| JP | 2011-146200 | 7/2011 |

OTHER PUBLICATIONS

Hitsohi Ota et al., Analysis of Vinylene Carbonate Derived SEI Layers of Graphite Anode, Journal of the Electrochemical Society, 151 (10), pp. A1659-1669, 2004.
JP Office Action of Appln. No. 2010-026052 dated Jun. 5, 2012 with English translation.

* cited by examiner

*Primary Examiner* — Carlos Barcena
*Assistant Examiner* — Lilia V Nedialkova
(74) *Attorney, Agent, or Firm* — Antonelli, Terry, Stout & Kraus, LLP.

(57) ABSTRACT

A lithium secondary battery includes a positive electrode which can occlude and discharge lithium ion, a negative electrode which can occlude and discharge lithium ion, a separator which is disposed between the positive electrode and the negative electrode, and an electrolyte. In order to suppress a deterioration for a period of high temperature storage at 50° C. or more, the electrolyte includes a compound within whose molecule a plurality of polymerizable functional groups are included.

The electrolyte can include a compound represented by the formula 3:

[Formula 3]

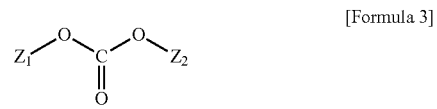

wherein each of $Z_1$ and $Z_2$ represents a polymerizable functional group including any one selected from the group consisting of allyl group, methallyl group, vinyl group, acryl group and methacryl group.

5 Claims, 2 Drawing Sheets

LITHIUM SECONDARY BATTERY

FIELD OF THE INVENTION

The present invention relates to a lithium secondary battery.

BACKGROUND OF THE INVENTION

From the perspective of environmental protection and energy saving, a hybrid electric vehicle using an engine and a motor together as a power source has been developed and commercialized. Furthermore, in the future the development of a fuel cell hybrid electric vehicle, in which a fuel cell is used in place of an engine, will also become popular.

For example, Non-Patent Document 1 proposes a battery wherein vinylene carbonate is added to an electrolyte comprising $LiPF_6$, ethylene carbonate and dimethyl carbonate in an amount of 2 wt. % whereby an increase in resistance (deterioration) can be suppressed for a period of high temperature (60° C.) storage.

[Non-Patent Document 1] Journal of The Electrochemical Society, 151(10) A1659-A1669 (2004).

BRIEF SUMMARY OF THE INVENTION

As a source of energy for this hybrid electric vehicle, a secondary battery which can be repeatedly charged and discharged is an essential technology.

Among others, a lithium secondary battery is high in operating voltage and characterized by high-energy density whereby a high power can be easily derived, which will increasingly become more important in future as a power supply for hybrid electric vehicles.

It is a technical problem for a lithium secondary battery as a power supply for hybrid electric vehicles to suppress an increase in resistance for a period of storage at a high temperature of 50° C. or more.

Conventionally, as a means to suppress an increase in resistance for a period of high temperature storage, the one in which a compound such as vinylene carbonate is added in an electrolyte was proposed.

However, when conventionally-proposed vinylene carbonate is used, although the increase of its additive amount can suppress an increase in resistance (deterioration) for a period of high temperature storage, a decrease in power may be caused at room temperature.

That is, the object of the present invention is to provide a lithium secondary battery which can suppress an increase in resistance (deterioration) for a period of storage at a high temperature of 50° C. or more without compromising the output characteristics at room temperature.

The present invention provides a lithium secondary battery comprising:
a positive electrode which can occlude and discharge lithium ion;
a negative electrode which can occlude and discharge lithium ion;
a separator which is disposed between the positive electrode and the negative electrode; and
an electrolyte,
wherein the electrolyte comprises a compound within whose molecule a plurality of polymerizable functional groups are included.

Herein the electrolyte preferably comprises, as a solvent, a cyclic carbonate represented by the formula 1:

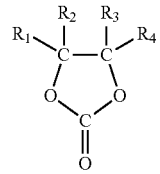

[Formula 1]

wherein each of $R_1$, $R_2$, $R_3$ and $R_4$ represents any one selected from the group consisting of hydrogen, fluorine, chlorine, an alkyl group having a carbon atom number of 1 to 3, and a fluorinated alkyl group;
a chain carbonate represented by the formula 2:

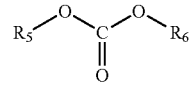

[Formula 2]

wherein each of $R_5$ and $R_6$ represents any one selected from the group consisting of hydrogen, fluorine, chlorine, an alkyl group having a carbon atom number of 1 to 3, and a fluorinated alkyl group; and
a compound represented by the formula 3:

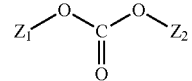

[Formula 3]

wherein each of $Z_1$ and $Z_2$ represents a polymerizable functional group including any one selected from the group consisting of allyl group, methallyl group, vinyl group, acryl group and methacryl group.

In addition, it is preferred that the electrolyte comprises dimethallyl carbonate as a solvent and the compound represented by the formula 3 mentioned above is dimethallyl carbonate.

It is preferred that the amount of dimethallyl carbonate to be added is in the range of 0.1 to 2.0 vol. %.

Furthermore, it is preferred that a positive-electrode active material for the positive electrode comprises a lithium composite oxide represented by the composition formula: $Li_\alpha Mn_x M1_y M2_z O_2$ wherein M1 is at least one selected from the group consisting of Co and Ni; M2 is at least one selected from the group consisting of Co, Ni, Al, B, Fe, Mg and Cr; $x+y+z=1$; $0<\alpha<1.2$; $0.2 \leq x \leq 0.6$; $0.2 \leq y \leq 0.4$; and $0.05 \leq z \leq 0.4$.

Additionally, it is preferred that a negative-electrode active material for the negative electrode comprises at least one selected from the group consisting of a carbonaceous material, an oxide including a IV-group element(s), and a nitride including a IV-group element(s).

The present invention can provide a lithium secondary battery which can suppress an increase in resistance (deterioration) during high temperature storage at 50° C. or more without compromising the output characteristics at room temperature.

Other objects, features and advantages of the invention will become apparent from the following description of the embodiments of the invention taken in conjunction with the accompanying drawings.

DETAILED DESCRIPTION OF THE INVENTION

Figure 1:
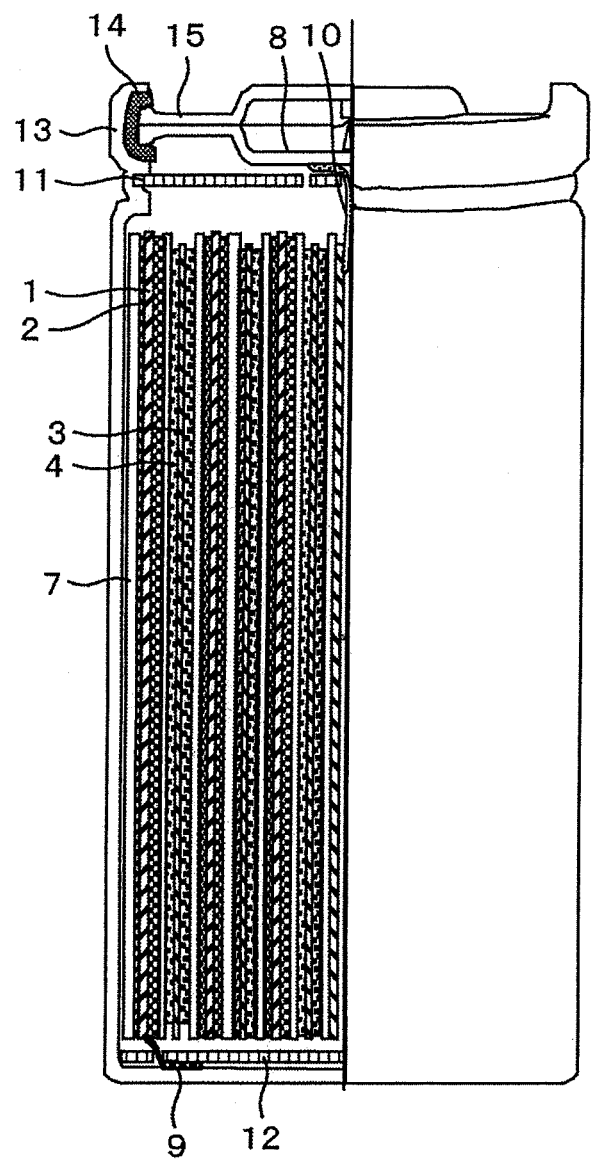
FIG. 1 shows a half sectional view of a wound-type battery of the present example.

A lithium secondary battery (which is hereinafter referred to as "battery") of the present embodiment comprises a positive electrode which can occlude and discharge lithium ion, a negative electrode which can occlude and discharge lithium ion, a separator which is disposed between the positive electrode and the negative electrode, and an electrolyte.

Herein the electrolyte preferably comprises, as a solvent, a cyclic carbonate represented by the formula 1:

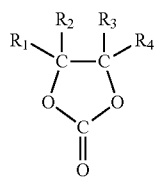

[Formula 1]

wherein each of $R_1$, $R_2$, $R_3$ and $R_4$ represents any one selected from the group consisting of hydrogen, fluorine, chlorine, an alkyl group having a carbon atom number of 1 to 3, and a fluorinated alkyl group;

a chain carbonate represented by the formula 2:

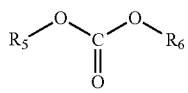

[Formula 2]

wherein each of $R_5$ and $R_6$ represents any one selected from the group consisting of hydrogen, fluorine, chlorine, an alkyl group having a carbon atom number of 1 to 3, and a fluorinated alkyl group; and a compound represented by the formula 3:

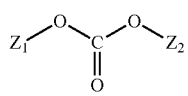

[Formula 3]

wherein each of $Z_1$ and $Z_2$ represents a polymerizable functional group including any one selected from the group consisting of allyl group, methallyl group, vinyl group, acryl group and methacryl group.

Herein the positive electrode comprises a positive-electrode combined agent and a positive electrode collector, and a positive-electrode combined agent layer is a combined agent layer which is formed by applying the positive-electrode combined agent comprising a positive-electrode active material, a electrically conductive material and a binder to the positive electrode collector.

In addition, the negative electrode comprises a negative-electrode combined agent and a negative electrode collector, and a negative-electrode combined agent layer is a combined agent layer which is formed by applying the negative-electrode combined agent comprising a negative-electrode active material, a electrically conductive material and a binder to the negative electrode collector.

Herein a positive electrode concerned with an example of the present embodiment comprises a positive-electrode active material, which preferably comprises a lithium composite oxide represented by the composition formula: $Li_\alpha Mn_x M1_y M2_z O_2$ wherein M1 is at least one selected from the group consisting of Co and Ni; M2 is at least one selected from the group consisting of Co, Ni, Al, B, Fe, Mg and Cr; $x+y+z=1$; $0<\alpha<1.2$; $0.2 \le x \le 0.6$; $0.2 \le y \le 0.4$; and $0.05 \le z \le 0.4$.

In addition, a negative electrode concerned with an example of the present embodiment comprises a negative-electrode active material, which preferably comprises at least one selected from the group consisting of a carbonaceous material, an oxide including a IV-group element(s), and a nitride including a IV-group element(s).

Furthermore, it is preferred that the composition ratio of the compound (cyclic carbonate) represented by the formula 1 is in the range of 18.0 to 30.0 vol. %, the composition ratio of the compound (chain carbonate) represented by the formula 2 is in the range of 74.0 to 81.8 vol. %, and the composition ratio of the compound represented by the formula 3 is in the range of 0.1 to 2.0 vol. %, all in the electrolyte. Incidentally, it is further preferred that the composition ratio of the compound represented by the formula 3 is in the range of 0.4 to 1.6 vol. %.

Herein the composition ratio of the compound represented by the formula 3 more than 2.0 vol. % increases the internal resistance of the battery to cause the power decrease of the battery, and thus it is not suitable.

Additionally, it is preferred that the compound represented by the formula 1 is ethylene carbonate, the compound represented by the formula 2 is at least one of ethylmethyl carbonate or dimethyl carbonate, and the compound represented by the formula 3 dimethacryl carbonate.

The compound represented by the formula 1 used can include ethylene carbonate (EC), trifluoropropylene carbonate (TFPC), chloroethylene carbonate (ClEC), fluoroethylene carbonate (FEC), trifluoroethylene carbonate (TFEC), difluoroethylene carbonate (DFEC), vinylethylene carbonate (VEC), and the like.

Specifically, in light of film formation on a negative-electrode combined agent layer, it is preferred to use EC.

Additionally, the addition of ClE, FEC, TFE and/or VEC in a small amount (2 vol. % or less) also plays a role in a film formation on the negative-electrode combined agent layer to provide good cycling characteristics.

Furthermore, the addition of TFP and/or DFEC in a small amount (2 vol. % or less) also plays a role in a film formation on the positive-electrode combined agent layer, and thus they could be added.

The compound represented by the formula 2 used can include dimethyl carbonate (DMC), ethylmethyl carbonate (EMC), diethyl carbonate (DEC), methylpropyl carbonate (MPC), ethylpropyl carbonate (EPC), trifluoromethylethyl carbonate (TFMEC), 1,1,1-trifluoroethylmethyl carbonate (TFEMC), or the like.

DMC is a highly compatible solvent, and is suitable for use by mixture with EC or the like.

DEC has a lower melting point than that of DMC, and is suitable for low-temperature (e.g. −30° C.) characteristics.

EMC is asymmetric in molecular structure, and has a low melting point, and thus it is suitable for low-temperature characteristics.

Each of EPC and TFMEC has propylene side chain and an asymmetric structure of molecule, and thus they are suitable as an adjusting solvent for low-temperature characteristics.

TFEMC, a part of whose molecule is fluorinated, has a large dipole moment, and thus it is suitable for maintaining the dissociation property of a lithium salt at a low temperature, and suitable for the low-temperature characteristics.

In addition, the compound represented by the formula 2 used can include vinylene carbonate (VC), methylvinylene carbonate (MVC), dimethylvinylene carbonate (DMVC), ethylvinylene carbonate (EVC), diethylvinylene carbonate (DEVC), or the like.

VC has a small molecule, and is considered to form a dense electrode coating. MVC, DMVC, EVC, DEVC, or the like, in which an alkyl group is added to VC, are considered to form a low-density electrode film according to the size of the alkyl group, and are considered to effectively act for the enhancement of the low-temperature characteristics.

The compound represented the formula 3 used can include, for example, dimethallyl carbonate (DMAC).

That is, the battery of the present embodiment preferably, as a solvent, comprises a compound represented by the formula 3:

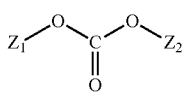

[Formula 3]

wherein each of $Z_1$ and $Z_2$ represents a polymerizable functional group including any one selected from the group consisting of allyl group, methallyl group, vinyl group, acryl group and methacryl group.

As the compound represented by the formula 3, dimethallyl carbonate (DMAC) is most preferred.

Additionally, when the compound represented by the formula 1 is ethylene carbonate and the compound represented by the formula 3 is dimethacryl carbonate, in light of the degradation control for a period of a high-temperature storage, the mixing ratio (DMAC/EC) of them is preferably in the range of 0.005 to 0.1, and in particular preferably in the range of 0.02 to 0.08.

Then, the lithium salt used in the electrolyte is not limited to but can include $LiPF_6$, $LiBF_4$, $LiClO_4$, LiI, LiCl, LiBr, or the like as an inorganic lithium salt, or $LiB[OCOCF_3]_4$, $LiB[OCOCF_2CF_3]_4$, $LiPF_4[CF_3]_2$, $LiN(SO_2CF_3)_2$, $LiN(SO_2CF_2CF_3)_2$, or the like as an organic lithium salt.

In particular, $LiPF_6$, which is extensively used for a battery, is a suitable material in light of the stability of quality.

In addition, $LiB[OCOCF_3]_4$ is excellent in dissociation property and solubility, and shows high electric conductivity at a small concentration, and thus it is an effective material.

The positive electrode is formed by applying a positive-electrode combined agent layer comprising a positive-electrode active material and a binder on an aluminum foil as a collector.

Furthermore, in order to decrease the electronic resistance, an electrically conductive material (electro-conductive material) could be further added to the positive-electrode combined agent layer.

It is preferred that the positive-electrode active material comprises a lithium composite oxide represented by the composition formula: $Li_\alpha Mn_x M1_y M2_z O_2$ wherein M1 is at least one selected from the group consisting of Co and Ni; M2 is at least one selected from the group consisting of Co, Ni, Al, B, Fe, Mg and Cr; x+y+z=1; $0<\alpha<1.2$; $0.2 \leq x \leq 0.6$; $0.2 \leq y \leq 0.4$; and $0.05 \leq z \leq 0.4$.

In addition, among others, it is more preferred that M1 is Ni or Co, and M2 is Co or Ni. It is still more preferred that the formula is $LiMn_{1/3}Ni_{1/3}Co_{1/3}O_2$.

The larger the amount of Ni in the composition is, the larger the capacity is, while the larger the amount of Co is, the more the power in a low temperature is enhanced, while when the amount of Mn is larger, the material cost can be suppressed.

Besides, the additive elements are effective for the stability of the cycle characteristic.

In addition, an orthorhombic-crystal phosphate compound having the symmetric property of a space group: Pmnb which is the general formula: $LiM_xPO_4$ wherein M is Fe or Mn, and $0.01 \leq x \leq 0.4$, or $LiMn_{1-x}M_xPO_4$ wherein M is a divalent cation other than Mn, and $0.01 \leq x \leq 0.4$ could be used.

In particular, $LiMn_{1/3}Ni_{1/3}Co_{1/3}O_2$ is high in low-temperature characteristics and cycle stabilities, and thus is suitable as a lithium-battery material for a hybrid electric vehicle (HEV).

As the binder, any one could be used, provided that it can adhere a material constituting a positive electrode to a positive-electrode collector. For example, a homopolymer or a copolymer of vinylidene fluoride, tetrafluoroethylene or acrylonitrile, ethylene oxide etc. or a styrene-butadiene rubber etc. can be used.

The electrically conductive material is, for example, a carbon material such as carbon black, graphite, carbon fiber, or metallic carbide, each of which can be used independently or by mixture.

The negative electrode is formed by applying a negative-electrode combined agent layer comprising a negative-electrode active material and a binder on a copper foil as a collector.

Furthermore, in order to decrease the electronic resistance, an electrically conductive material (electro-conductive material) could be further added to the negative-electrode combined agent layer.

A material used as the negative-electrode active material can include: natural graphite; a composite carbonaceous material having a film formed according to a dry CVD (chemical vapor deposition) method or a wet spray method on natural graphite; an artificial graphite formed by calcinating a resin material such as epoxy or phenol or a pitch material derived from petroleum or coal, as a raw material; a carbonaceous material such as an amorphous carbon material; a lithium metal which can occlude and discharge lithium by forming a compound with lithium; an oxide or nitride of an element of the fourth group such as silicon, germanium or tin which can occlude and discharge lithium by forming a compound with lithium and inserting into crystalline pores.

Incidentally, these may be generally referred to as a negative-electrode active material.

Especially, the carbonaceous material is high in electrically conductive property, and is an excellent material in light of low-temperature characteristics and cycle stability.

Among the carbonaceous materials, a material having a wide net carbon surface interlayer spacing ($d_{002}$) is excellent in quick charge and discharge and low-temperature characteristics, and thus preferred. However, a material having a wide $d_{002}$ could be low in capacity and low in charging and discharging efficiency in an initial charging. Therefore, it is preferred that $d_{002}$ is 0.390 nm or less. A carbonaceous material like this could be referred to as a pseudo-anisotropic carbon.

Furthermore, in order to constitute the electrode, a high electrically conductive carbonaceous material such as graphitic, amorphous, or activated carbon could be mixed.

Otherwise as a graphitic material, a material having any one of the characteristics shown in the following (1) to (3) could be used.

(1) that an R-value ($I_D/I_G$), which is an intensity ratio between a peak intensity ($I_D$) in the range of 1300 to 1400 cm$^{-1}$ as determined with Raman spectroscopic spectra to a peak intensity ($I_G$) in the range of 1580 to 1620 cm$^{-1}$ as determined with Raman spectroscopic spectra is 0.20 or more and 0.4 or less;

(2) that the Δ value of half-width of a peak in the range of 1300 to 1400 cm$^{-1}$ as determined with Raman spectroscopic spectra is 40 cm$^{-1}$ or more and 100 cm$^{-1}$ or less; and/or (3) that the X-value ($I_{(110)}/I_{(004)}$) of an intensity ratio between the peak intensity ($I_{(110)}$) of the (110) surface and the peak intensity ($I_{(004)}$) of the (004) surface according to an X-ray diffraction is 0.10 or more and 0.45 or less.

As the binder, any one can be used, provided that the one can adhere a material constituting a negative electrode to a negative-electrode collector. For example, a homopolymer or a copolymer of vinylidene fluoride, tetrafluoroethylene or acrylonitrile, ethylene oxide, etc. or a styrene-butadiene rubber etc. can be used.

The electrically conductive material is, for example, a carbon material such as carbon black, graphite, carbon fiber, and metallic carbide, each of which can be used independently or by mixture.

As described above, the lithium secondary battery of the present embodiment can provide the one wherein an increase in resistance (deterioration) is suppressed for a period of storage at a high temperature of 50° C. or more without compromising the output characteristics at room temperature, that is, without causing a power decrease at room temperature with the power characteristics maintained, compared with a conventional lithium secondary battery.

Accordingly, the lithium secondary battery of the present invention can be widely utilized as an electric power supply for a hybrid car, for a motor-driven control system of a car, or for back up, which could be exposed at a high temperature of 50° C. or more, while it is also suitable as an electric power supply for industrial equipment such as a machine tool or a forklift.

Hereinafter best mode for carrying out the present embodiment will be described by specific examples.

Example 1

(The Production of a Wound-Type Battery)

According to the method shown hereinafter, a wound-type battery of the present example was produced.

FIG. 1 shows a half sectional view of a wound-type battery of the present example.

First of all, $LiMn_{1/3}Ni_{1/3}Co_{1/3}O_2$ was used as a positive-electrode active material, carbon black (CB1) and graphite (GF2) were used as an electro-conductive material, and polyvinylidene-fluoride (PVDF) was used as a binder, while as a solvent, NMP (N-methylpyrrolidone) was used such that the weight ratio of dry solids content became $LiMn_{1/3}Ni_{1/3}Co_{1/3}O_2$:CB1:GF2:PVDF=86:9:2:3, whereby a positive-electrode material paste was prepared.

This positive-electrode material paste was applied to an aluminum foil to become a positive-electrode collector (1), dried at 80° C., and pressed by a pressure roller, followed by the drying at 120° C. to form the positive-electrode combined agent layer (2) into the positive-electrode collector (1).

Then, pseudo-anisotropic carbon, which is amorphous carbon, was used as a negative-electrode active material, carbon black (CB2) was used as an electro-conductive material, and PVDF was used as a binder, followed by using NMP as a solvent such that the weight ratio of dry solids content became pseudo-anisotropic carbon:CB2:PVDF=88:5:7, whereby a negative-electrode material paste was prepared.

This negative-electrode material paste was applied to a copper foil to become a negative-electrode collector (3), dried at 80° C., and pressed by a pressure roller, followed by the drying at 120° C. to form the negative-electrode combined agent layer (4) into the negative-electrode collector (3).

As an electrolyte, the one wherein solvents were mixed in the volume composition ratio of EC:DMAC:DMC:EMC=20:0.4:39.8:39.8 was used, while $LiPF_6$ as the lithium salt was dissolved in an amount of 1 M to prepare the electrolyte.

Herein an especially important relationship as an electrolyte is the mixing ratio of EC and DMAC, which is EC:DMAC=20:0.4 in Example 1, that is, DMAC/EC is 0.02, wherein the electrolyte is stable even for a period of a high-temperature storage, and the performance degradation is decreased.

A separator (7) was sandwiched between the produced electrodes to form a wound group, which was inserted into a negative-electrode canister (13).

Then, in order to collect current in the negative electrode, the one end of a negative-electrode lead wire (9) of nickel was welded to the negative-electrode collector (3), while the other end was welded to the negative-electrode canister (13).

In addition, in order to collect current in the positive electrode, the one end of a positive-electrode lead wire (10) of aluminum was welded to the positive-electrode collector (1), while the other end was electrically connected to a positive-electrode battery cap (15) through a current cutting valve (8).

Furthermore, the electrolyte was injected into the canister (13), and the same was caulked to produce the wound-type battery.

Incidentally, in FIG. 1, the reference numerals (11), (12) and (14) show a positive-electrode insulator, a negative-electrode insulator, and a gasket, respectively.

(The Evaluation of the Battery)

The capacity maintenance ratio and direct current resistance (DCR) of the wound-type battery shown in FIG. 1 for a period of storage at 70° C. were evaluated according to the following procedures, respectively.

Evaluation procedure of capacity maintenance ratio

The battery was charged to 4.1 V under a constant current of 0.7 A, and charged till the current value became 20 mA under a constant voltage of 4.1 V, followed by the discharge to 2.7 V under 0.7 A after an off-period of operation for 30 minutes.

This operation was repeated five times.

The fifth discharge capacity was defined as an initial capacity.

Then, the battery after storage at 70° C. was charged to 4.1 V under a constant current of 0.7 A, and charged till the current value became 20 mA under a constant voltage of 4.1 V, followed by the discharge to 2.7 V under 0.7 A after an off-period of operation for 30 minutes.

This operation was repeated two times.

The second discharge capacity was defined as a post-storage capacity.

The storage days were set to 14 and 30 days.

The temperature during the measurement was 25° C. The post-storage capacity to the initial capacity was defined as a capacity maintenance ratio, and the present results are shown in Table 1 and FIG. 2.

Figure 2:
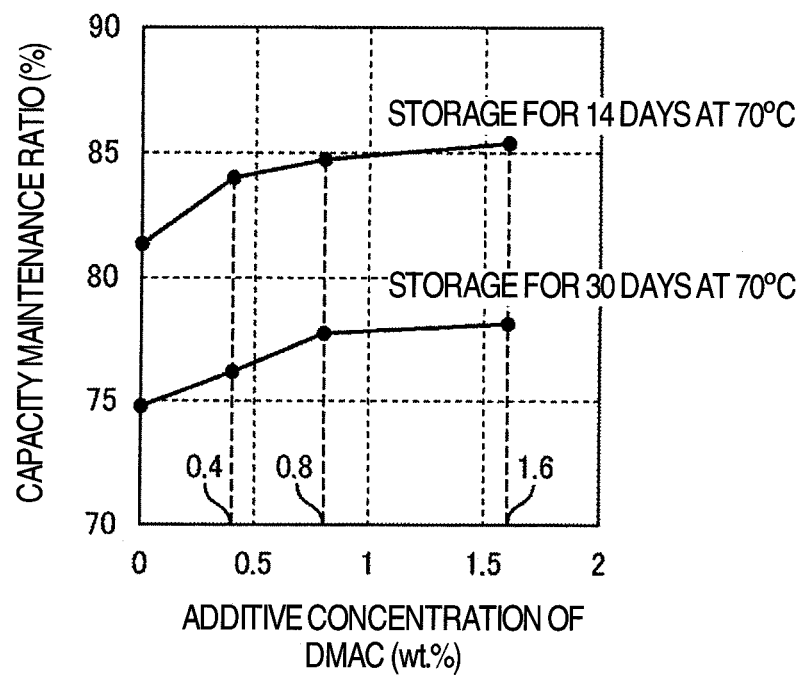
FIG. 2 is a diagram showing a relationship between the capacity maintenance ratio and the additive concentration.

FIG. 2 is a diagram showing a relationship between the capacity maintenance ratio and the additive concentration.

Evaluation procedure of DCR

The battery was charged to 4.1 V under a constant current of 0.7 A, and charged till the current value became 20 mA under a constant voltage of 4.1 V, followed by the discharge to 2.7 V under 0.7 A after an off-period of operation for 30 minutes.

This operation was repeated three times.

Then, the battery was charged to 3.8 V under a constant current of 0.7 A, and discharged under 10 A for 10 seconds, while again charged to 3.8 V under a constant current, and discharged under 20 A for 10 seconds, while again charged to 3.8 V, and discharged under 30 A for 10 seconds.

From the I-V characteristics in this case, the DCR of the battery was evaluated.

The temperature during the measurement was 25° C.

The post-storage DCR to the initial DCR was defined as a DCR coefficient of fluctuation, while the present results are shown in Table 1.

(Evaluation of Negative-Electrode Surface Film)

A battery separately produced was dismounted, followed by the evaluation of a product on the negative-electrode surface by means of a time-of-flight type secondary ion mass spectrometer (TOF-SIMS). The peak intensity at an m/z=83 was $9 \times 10^{-5}$.

Example 2

A battery was produced and evaluated in a similar manner to the one in Example 1, except that as a solvent, the one wherein solvents were mixed in the volume composition ratio of EC:DMAC:DMC:EMC=20:0.8:39.6:39.6 was used. The results are shown in Table 1 and FIG. 2.

Herein, an especially important relationship as an electrolyte is the mixing ratio of EC and DMAC, which is EC:DMAC=20:0.8 in Example 2, that is, DMAC/EC is 0.04, wherein the electrolyte is stable even for a period of a high-temperature storage, and the performance degradation is decreased.

In addition, a battery separately produced was dismounted, followed by the evaluation of a product on the negative-electrode surface by means of a time-of-flight type secondary ion mass spectrometer (TOF-SIMS). The peak intensity at an m/z=83 was $1 \times 10^{-4}$.

Example 3

A battery was produced and evaluated in a similar manner to the one in Example 1, except that as a solvent, the one wherein solvents were mixed in the volume composition ratio of EC:DMAC:DMC:EMC=20:1.6:39.2:39.2 was used. The results are shown in Table 1 and FIG. 2.

Herein, an especially important relationship as an electrolyte is the mixing ratio of EC and DMAC, which is EC:DMAC=20:1.6 in Example 3, that is, DMAC/EC is 0.08, wherein the electrolyte is stable even for a period of a high-temperature storage, and the performance degradation is decreased.

In addition, a battery separately produced was dismounted, followed by the evaluation of a product on the negative-electrode surface by means of a time-of-flight type secondary ion mass spectrometer (TOF-SIMS). The peak intensity at an m/z=83 was $2 \times 10^{-4}$.

Comparative Example 1

A battery was produced and evaluated in a similar manner to the one in Example 1, except that as a solvent, the one wherein solvents were mixed in the volume composition ratio of EC:DMAC:DMC:EMC=20:0:40:40 was used. The results are shown in Table 1 and FIG. 2.

In addition, a battery separately produced was dismounted, followed by the evaluation of a product on the negative-electrode surface by means of a time-of-flight type secondary ion mass spectrometer (TOF-SIMS). The peak intensity at an m/z=83 was $8 \times 10^{-5}$.

Comparative Example 2

A battery was produced and evaluated in a similar manner to the one in Example 1, except that as a solvent, the one wherein solvents were mixed in the volume composition ratio of EC:VC:DMC:EMC=19.2:0.8:40:40 was used. The results are shown in Table 1 and FIG. 2.

Comparative Example 3

A battery was produced and evaluated in a similar manner to the one in Example 1, except that as a solvent, the one wherein solvents were mixed in the volume composition ratio of EC:DMAC:DMC:EMC=0:100:0:0 was used. The results are shown in Table 1.

TABLE 1

| | Composition of Electrolyte | | | | | | Capacity Maintenance Ratio @after 14 days (%) | Capacity Maintenance Ratio @after 30 days (%) | DCR @25° C. (mΩ) | DCR Coefficient of fluctuation @after 14 days (%) | DCR Coefficient of fluctuation @after 30 days (%) |
|---|---|---|---|---|---|---|---|---|---|---|---|
| | LiPF$_6$ (M) | EC (vol %) | VC (vol %) | DMAC (vol %) | DMC (vol %) | EMC (vol %) | | | | | |
| Example 1 | 1 | 20 | 0 | 0.4 | 39.8 | 39.8 | 84.0 | 76.1 | 68.0 | 108.0 | 112.0 |
| Example 2 | 1 | 20 | 0 | 0.8 | 39.6 | 39.6 | 84.8 | 77.7 | 70.0 | 107.6 | 111.2 |
| Example 3 | 1 | 20 | 0 | 1.6 | 39.2 | 39.2 | 85.4 | 78.1 | 72.0 | 107.3 | 111.0 |
| Comparative Example 1 | 1 | 20 | 0 | 0 | 40 | 40 | 81.4 | 74.8 | 65.0 | 109.3 | 112.6 |
| Comparative Example 2 | 1 | 20 | 0.8 | 0 | 39.6 | 39.6 | 83.4 | 75.1 | 70.0 | 109.1 | 112.3 |
| Comparative Example 3 | 1 | 0 | 0 | 100 | 0 | 0 | 75.0 | 62.0 | 210.0 | 120.0 | 125.0 |

That is, there exists the mixing ratio of EC and DMAC as an especially important relationship as an electrolyte. It is preferred that this mixing ratio of DMAC/EC is in the range of 0.02 to 0.08, whereby the electrolyte is stable even for a period of a high-temperature storage, and the performance degradation is decreased.

Thus, it is found that the battery described in each of Examples 1 to 3, wherein DMAC is added to the electrolyte, is smaller in performance degradation for a period of a high-temperature storage compared with the one described in each of Comparative Examples 1 and 2, wherein DMAC is not mixed with an electrolyte.

Additionally, the electrolyte of DMAC merely is large in performance degradation.

As described above, according to Examples 1 to 3, a battery which can suppress degradation for a period of storage at a high temperature of 50° C. or more can be provided.

It should be further understood by those skilled in the art that although the foregoing description has been made on embodiments of the invention, the invention is not limited thereto and various changes and modifications may be made without departing from the spirit of the invention and the scope of the appended claims.

[Industrial Applicability]

The present invention can be widely utilized, in particular, as an electric power supply for a hybrid car, for a motor-driven control system, or for back up.

[Description Of Reference Numerals]

| 1  | positive electrode collector, |
| 2  | positive-electrode combined agent layer, |
| 3  | negative electrode collector, |
| 4  | negative-electrode combined agent layer, |
| 7  | separator, |
| 8  | current cutting valve, |
| 9  | negative electrode lead, |
| 10 | positive electrode lead, |
| 11 | positive electrode insulator, |
| 12 | negative electrode insulator, |
| 13 | negative-electrode battery canister, |
| 14 | gasket, and |
| 15 | positive-electrode battery cap. |

The invention claimed is:

1. A lithium secondary battery comprising:
a positive electrode which can occlude and discharge lithium ion;
a negative electrode which can occlude and discharge lithium ion;
a separator which is disposed between said positive electrode and said negative electrode; and
an electrolyte
comprising ethylene carbonate, dimethyl carbonate, ethylmethyl carbonate and dimethallyl carbonate within whose molecule a plurality of polymerizable functional groups are included, wherein a volume ratio of said dimethallyl carbonate to said ethylene carbonate is from 0.005 to 0.1.

2. The lithium secondary battery in claim 1, characterized in that as a positive-electrode active material, said positive electrode comprises a lithium composite oxide represented by the composition formula: $Li_\alpha Mn_x M1_y M2_z O_2$ wherein M1 is at least one selected from the group consisting of Co and Ni; M2 is at least one selected from the group consisting of Co, Ni, Al, B, Fe, Mg and Cr; $x+y+z=1$; $0<\alpha<1.2$; $0.2 \leq x \leq 0.6$; $0.2 \leq y \leq 0.4$; and $0.05 \leq z \leq 0.4$.

3. The lithium secondary battery in claim 1, characterized in that as a negative-electrode active material, said negative electrode comprises at least one selected from the group consisting of a carbonaceous material, an oxide including a IV-group element(s), and a nitride including a IV-group element(s).

4. The lithium secondary battery in claim 1, characterized in that an additive amount of said dimethallyl carbonate is in the range of 0.1 to 2.0 vol. %.

5. The lithium secondary battery in claim 1, characterized in that a volume ratio of said dimethallyl carbonate to said ethylene carbonate is from 0.02 to 0.08.

* * * * *